Oct. 5, 1948.                J. J. BAUMAN                2,450,823
              HUMIDITY CONTROL MEANS RESPONSIVE TO
                MOVEMENTS OF REFRIGERATOR DOORS
Filed June 30, 1944                            2 Sheets-Sheet 1
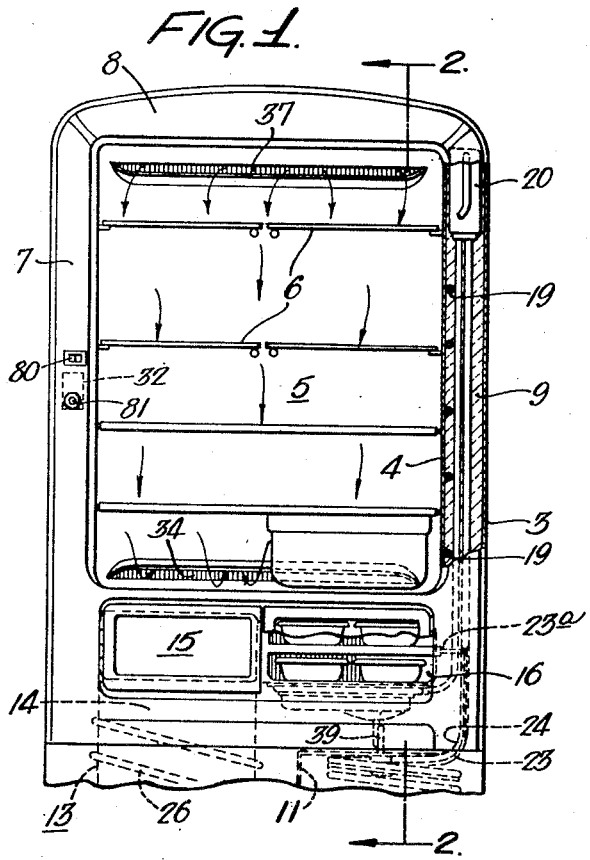
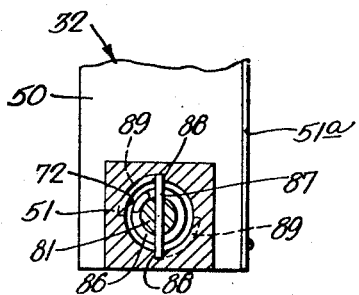
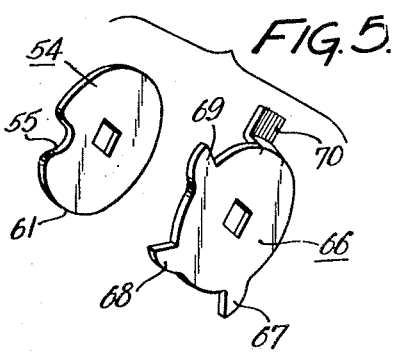
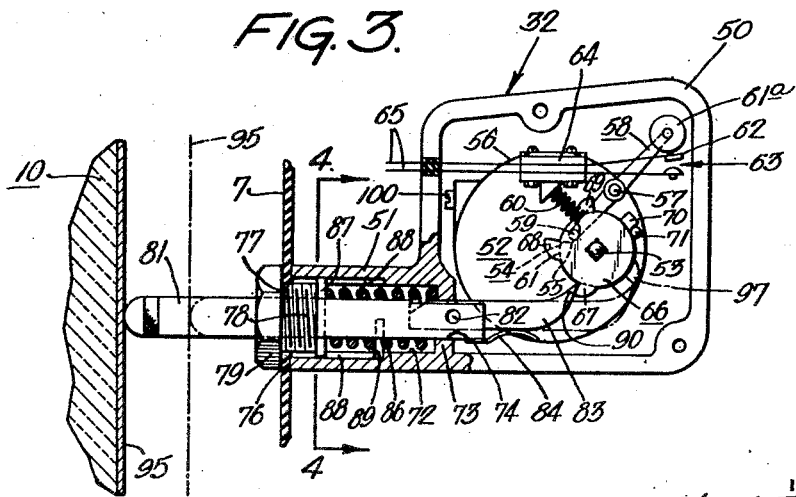
INVENTOR
John J. Bauman
BY
Howson & Howson
ATTORNEYS Oct. 5, 1948.   J. J. BAUMAN   2,450,823
HUMIDITY CONTROL MEANS RESPONSIVE TO
MOVEMENTS OF REFRIGERATOR DOORS
Filed June 30, 1944   2 Sheets-Sheet 2

INVENTOR
John J. Bauman
BY
Howson + Howson
ATTORNEYS

Patented Oct. 5, 1948

2,450,823

UNITED STATES PATENT OFFICE 2,450,823

HUMIDITY CONTROL MEANS RESPONSIVE TO MOVEMENTS OF A REFRIGERATOR DOOR

John J. Bauman, Abington, Pa., assignor, by mesne assignments, to Philco Corporation, Philadelphia, Pa., a corporation of Pennsylvania Application June 30, 1944, Serial No. 542,888

5 Claims. (Cl. 62—6)

This invention relates to an improvement in refrigerators of the type described and claimed in the co-pending application of Malcolm G. Shoemaker, Serial Number 528,581, filed March 29, 1944, now Patent No. 2,416,354 granted February 25, 1947.

The refrigerator therein disclosed is of the type which includes a moist-cold food storage compartment, a frozen food storage compartment and a freezing compartment. Cooling of the frozen food storage and freezing compartments is effected through the medium of a primary refrigerating system; while cooling of the moist-cold food storage compartment is effected by a secondary refrigerating system having its condenser portion cooled by an auxiliary evaporator of the primary system.

A particular feature of the aforesaid refrigerator resides in the forced circulation of air through the moist-cold compartment and into heat exchange relation with a portion of the primary evaporator for the purpose of removing excess humidity. This circulation is accomplished by providing an air channel having an outlet into the food storage compartment at a position adjacent the top of the compartment, and an inlet at a position adjacent the bottom of the compartment. From the inlet opening the channel extends adjacent the primary evaporator and upwardly at the back of the compartment to the outlet aperture. A motor actuated blower is provided within the passage for effecting such circulation. Operation of the blower may be in response to excessive humidity condition within the compartment as determined by a humidistat or other suitable humidity-sensitive means, or it may be started mechanically at predetermined intervals and continue for a timed period the length of which is based upon the estimated average humidity condition within the compartment. It is with this latter means for controlling such circulation of the air that the instant invention has especial reference.

It is well known in refrigeration that conditions of excessive humidity in the food storage space are mainly caused by the entrance of warm moisture-laden air into the space each time the main door is opened. The temperature of the air so introduced frequently reaches the dew point upon being cooled in the refrigerator, and causes undesirable precipitation of moisture upon the walls and contents of the refrigerator. It is desirable, therefore, to remove the excess moisture in the air to an extent precluding such precipitation of moisture, and it is also desirable that such reduction in humidity be accomplished automatically without special manual manipulation. To this end it is an object of the invention to provide for intermittent circulation of the air of the refrigerated space into heat exchange relation with a colder zone, said circulation being in response to normal manipulations of the refrigerator door.

A further object of the invention is to provide, for the purpose of regulating said circulation, an automatic timing device responsive to normal manipulations of the said door.

Still another object of the invention is to provide a timing device automatically operable to maintain the aforesaid circulation of air for periods of time calculated on the basis of the estimated average humidity condition of the particular geographical location wherein the refrigerator is installed.

A further object of the invention is the provision of a timing device as aforesaid which is readily adjustable to different climatic conditions.

It is a still further object of the invention to provide a timing mechanism of the stated character characterized by simple and economical construction as hereinafter described.

In the drawings:

Figure 1 is an elevational view, partially in section, of a refrigerator embodying the invention, the refrigerator being shown with its lower portion broken away and with the main food compartment door removed;

Figure 3 is a view, on an enlarged scale, of the timing device of the present invention with its cover plate removed and parts broken away to more clearly illustrate the details thereof;

Figure 4 is a view taken along line 4—4 of Figure 3; and

Figure 5 is an exploded perspective view of certain elements of the invention.

Figure 2:
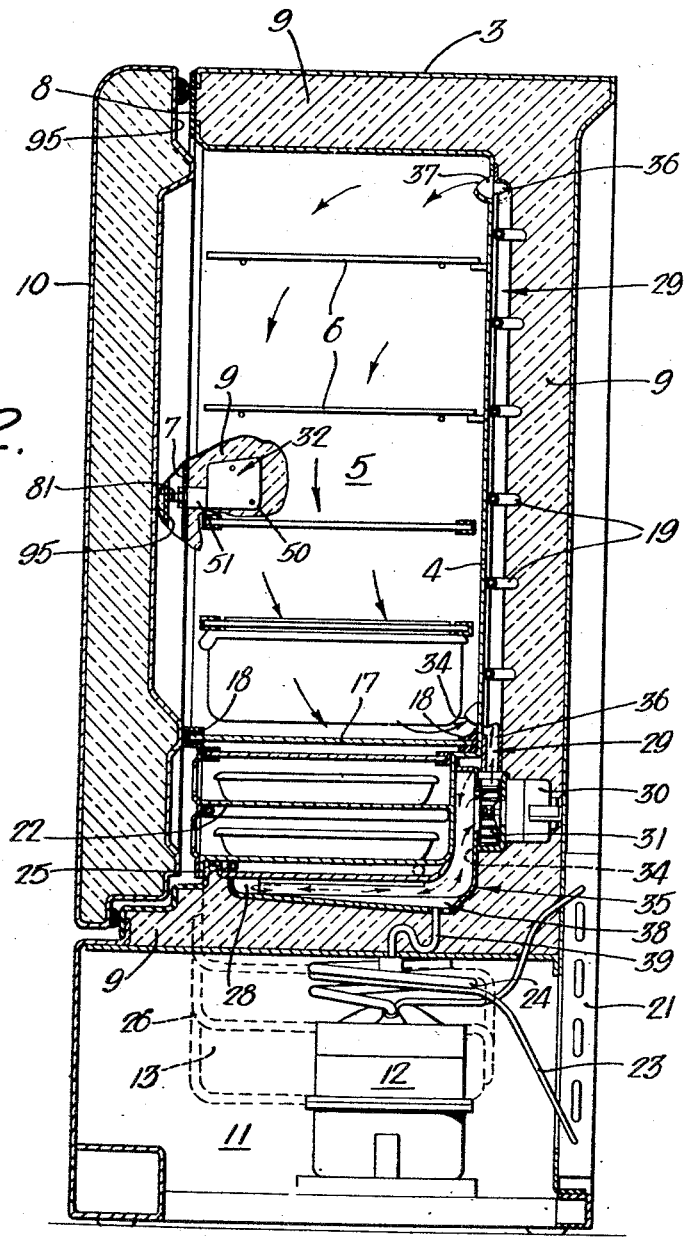
Figure 2 is a vertical sectional view of the refrigerator, taken substantially along the line 2—2 of Figure 1, with the main door included and a portion of the inner liner and door broken away to illustrate more clearly the location of the device embodying the instant invention.

In Figures 1 and 2 of the drawings, there is illustrated a domestic refrigerator of the mechanical type which includes an outer shell 3, which may be of any well-known type and construction, and an inner metal shell or liner member 4 providing the main food storage space, indicated generally at 5. This space 5 may be fitted with a plurality of shelves 6, of any desired type. Vertical and horizontal breaker strips 7 and 8, respectively, of low thermal conductivity, are fitted around the forward marginal edge of the cabinet opening, while thermal insulation, portions of which are indicated at 9, completely surrounds the inner liner member 4 as well as the outside surfaces of the cooling means presently to be described. The cabinet is provided with a door 10, said door being adapted to seat in the plane of the breaker strips 7 and 8, as illustrated in Fig. 2.

A machinery compartment 11 is located in the lower portion of the cabinet structure, which compartment houses the compressor unit indicated generally at 12. The main, sharp-freezing evaporator storage section is shown at 13 and includes, generally, a relatively large well-type storage area 14, to which access may be had through a door 15, and a smaller ice-freezing space indicated at 16. This evaporator may be supported within the refrigerator in any convenient manner, as for example, by welding its outer vertical walls to an inturned flange formed about the lower edges of the inner liner 4. Certain features of the particular evaporator, illustrated, are disclosed and claimed in the co-pending application of Donald E. Dailey, Serial Number 515,950 filed December 28, 1943, now Patent No. 2,430,456 granted November 11, 1947, and as such features, per se, form no part of the present invention, detailed description thereof is not deemed necessary.

As best seen in Figure 2, a double-thickness insulating partition 17 provides the floor for the main storage compartment 5, this partition being interposed between the main evaporator sections and the storage compartment 5, in order to make it possible to operate that compartment at relatively high temperatures as compared with the temperature of the evaporator sections 14 and 16, and to prevent the undesirable frosting-out of moisture present in said compartment. As clearly appears in Figure 2, gasket members 18 surround the partition 17, said gaskets being interposed between the partition members and the adjacent wall portions of the inner liner 4.

Referring to Figure 2, it will be seen that the main food storage section 5 is cooled, primarily, by means of tubing 19 secured in convoluted arrangement to the exterior surface of the inner liner, and constituting the evaporator portion of a secondary refrigerant circuit of known type. Condensation of the secondary liquid is effected by means of heat exchange association between the secondary tubing and a small evaporator 20, which constitutes a series-connected portion of the main primary circuit utilized to effect refrigeration of the sharp-freezing compartments 14 and 16. A detailed description of this portion of the apparatus is not necessary herein, since the invention is not concerned therewith.

Although any convenient form of primary refrigerant circuit may be employed, there has been illustrated an arrangement in which (referring to Figures 1 and 2) the liquid refrigerant from the condenser 21 is delivered to a central shelf 22, in the ice freezing compartment, said delivery being effected through a capillary tube 23 arranged in heat exchange relation with the suction line 24. After passing through said shelf, the volatile refrigerant is delivered to passages 26 arranged about evaporator storage section 13, after which it flows through a lower pass of tubing 25 and is delivered to the small auxiliary evaporator element 20 by means of an upwardly extending conduit 27. After being passed in heat exchange relation with the refrigerant of the secondary system, the primary refrigerant is returned to the compressor unit through the downwardly extending suction conduit shown at 24 in Figure 1. It should be observed that the lower pass of tubing 25, referred to above, is arranged in close proximity to an airflow passage 28.

Cooling of the main food storage compartment 5 is accomplished through the medium of the secondary tubing 19; while additional heat transfer capacity is provided and the elimination of undesired humidity from said compartment is accomplished by effecting periodic circulation of compartment air through the several ducts 29 appearing in Figure 2, and thence into the passage 28 arranged in heat exchange relation with the primary evaporator tubing 25. At this point, there is a transfer of latent heat from the moisture-laden air to the low temperature tubing 25, and consequently, some of the moisture is condensed upon the surrounding surfaces. Subsequently, the air, whose absolute humidity has now been substantially decreased, is reinjected into the food storage compartment, and, combining with the air in said compartment, acts to lower the overall relative humidity therein. This circulation is effected, as and when required, by means of a motor 30 and associated fan 31 operable periodically in accordance with the estimated humidity conditions existing in the compartment 5. Further detailed description of the airflow passages illustrated is considered unnecessary herein as they form no part, per se, of the present invention. For additional description reference may be had to the Shoemaker application, aforesaid.

In accordance with the present invention, this controlled circulation is initiated by an automatic timing device 32 which operates to energize the motor 30 and to thereby actuate the blower fan 31 at periodic intervals and for a length of time calculated in accordance with an estimated average humidity condition prevalent in the particular locality in which the refrigerator is installed. The construction and operation of this device will be more fully described hereinafter.

The airflow is designated by arrows appearing in the drawings, from which it will be apparent that air is withdrawn from the compartment through a duct 34, passes downwardly through a saddle structure 35 arranged in heat exchange relation with the primary evaporator, thence upwardly through the blower unit 31 and a vertical passage 36, to duct 37 for re-injection into the main food storage compartment. It will be evident, the moving air gives up a portion of its heat to the tubing 25 of the primary evaporator thereby reducing the temperature of said air below the the dew point, and the resulting condensate flows to a sump or trap 38 formed in the rear portion of saddle structure 35. From this sump the liquid is delivered through pipe 39 into a receptacle (not shown) which is preferably in association with the compressor unit 12, in order that the condensate may be evaporated by the heat of, and in addition, may provide cooling for the unit.

Under normal conditions of operation, i. e., when the relative humidity in compartment 5 is below a desired predetermined maximum, the fan 31 is not in operation and the storage compartment is cooled solely by the secondary tubing 19 arranged about the liner walls. Since sufficient tubing is used to present a large heat exchange surface, it is possible to maintain compartment 5 at relatively low temperatures, for example in the neighborhood of 38–40° F. without creating any frosting zones within the compartment. Dehydration of the foods within the compartment is, therefore, prevented.

Referring now more particularly to the timing device 32 as illustrated in Figures 3, 4, and 5, this device includes a hollow box-like housing 50 provided with a centrally bored extension 51 at its lower left hand corner as viewed in Figure 3, and a cover plate 51a adapted to complete the enclosure. Within the housing is secured a mechanical clock mechanism 52 of spring-actuated design, from which extends the spring-winding shaft 53. Fitted to the outer end of said shaft is a washer-like disc 54 having a cut away or detent portion 55. Pivoted to the housing 56 of the clock mechanism, at 57, is a lever 58 having one end 59 spring-pressed, as by coil spring 60, into engagement with the outer rim 61 of said disc 54, and its other end adapted to engage, as by roller 61a, the spring leaf contacting arm 62 of a normally open electrical switch 63 secured to the clock housing, as at 64, and connected in series with motor 30 and any suitable source of electrical energy, as by wires 65.

Also secured to the outer end of shaft 53, so as to rotate with disc 54, is a ratchet member 66 having, preferably, three radially extending teeth 67, 68, and 69, and a radial extension 70 which is adapted to engage a stationary pin 71 fixed to housing 56. The extension is offset from the plane of the ratchet teeth in a direction toward the housing of the clock mechanism so that the end of pin 71 will clear the path of rotation of the teeth. In the position illustrated the clock mechanism is inoperative, i. e., the extension 70 is engaging pin 71 thus preventing clockwise movement of shaft 53. When in this position the spring-pressed end 59 of lever 58 is engaged within the detent portion 55 of disc 54, and the roller end 61a thereof is disengaged from arm 62 of switch 63, which arm is biased to its normally open position, as illustrated. Hence, motor 30 is not energized to operate the fan 31.

Housing extension 51 is provided with an axial bore 72 having an end wall 73 containing an axially located aperture 74. This extension provides a convenient means for securing the timer to the vertical breaker strip 7. This is accomplished by abutting the outer surface 76 of said extension against the breaker strip in alignment with an aperture 77 in the latter, and thereafter passing a threaded sleeve 78, having a flanged nut-like head 79, through the aperture 77 and threading it into the mouth of bore 72, said bore being provided with threads for this purpose. Thus the breaker strip is gripped between the nut-like head 79 and the outer surface 76 of the extension to thereby secure the housing to the breaker strip.

As shown in Figures 1 and 2 the timing device is located within the insulation between the inner liner and outer shell at a position just below the keeper 80 for the latch of the door 10. It should be understood, however, that this position is merely illustrative and that other positions, as suitable, may be chosen without departing from the invention.

Extending through sleeve 78, bore 72, aperture 74, and into the interior of housing 50 is a shaft or plunger 81 having its inner end slotted. Pivotally mounted in the slot as by means of a pin 82, is a pawl 83 which is resiliently urged to the position illustrated, by a spring leaf 84, said spring being suitably secured, as by welding, to the end of the shaft beneath the pawl. The shaft is normally urged to the left, as illustrated in Figure 3 by a coil spring 86 surrounding that portion of the shaft located in bore 72. One end of the spring is seated on end wall 73, and its other end bears against the ends of a pin 87 extending through the shaft 81 and projecting into opposed co-axial channels 88 formed in the walls of bore 72, each of which channels terminates in an arcuate groove 89, as best seen in Figure 4. The inner end of sleeve 78 acts as a stop means for limiting movement of the shaft to the left, as viewed in Figure 3.

It will be noted by reference to Figure 3 that the end 90 of pawl 83 engages the radial tooth 67 of ratchet 66 in a manner such that movement of plunger 81 to the right will rotate the ratchet in a counter-clockwise direction approximately one-fifth of a complete revolution to correspondingly wind up the clock spring. At the same time end 59 of lever 58 is cammed out of detent 55 to pivot the roller end 61a of the lever against spring arm 62 of switch 63 to thereby move arm 62 into contact with its associated contact 62a to close the switch, energizing motor 3 and actuating the fan to circulate the compartment air through the passages as described.

As illustrated in Fig. 3, the device is mounted so that the plunger 81, when extended by action of the spring 86, as shown in Figure 3, projects into the path of the main compartment door 10, assuming that the said door is open. When, therefore, the door is closed, the plunger is engaged by an inner surface of the door and is forced inwardly, as shown in broken lines in Figure 3. In this figure a part of the inner marginal surface 95 of the door is shown in full lines in the position wherein as the door is closing the said marginal surface initially engages the outer end of plunger 81. Further movement of the door toward the completely closed position moves the plunger inwardly and thereby rotates the ratchet 66 to wind the clock spring as described. When the door is fully closed the plunger 81 has moved to an extent sufficient to clear the end of the pawl from the path of the ratchet teeth during clockwise rotation of the ratchet under the urge of the clock spring.

When the door is again opened, spring 86 will move the plunger outwardly until pin 87 strikes the inner end of sleeve 78. During this movement the pawl 83 will be cammed by that one of the ratchet teeth which may be at the bottom of the ratchet, downwardly about its pivot, to an extent sufficient to clear the tooth, and thereafter the pawl will be urged upwardly by spring 84 into the tooth engaging position as illustrated.

Engagement of the ends of pin 87 in the coaxial slots or channels 88 prevents rotational movement of the shaft relative to housing 50 and prevents pawl 83 from becoming misaligned with respect to the ratchet 66 during normal operation of the device. The arcuate grooves 89 are provided for rendering the timing device inoperative. When the humidity conditions of the particular locality in which the refrigerator is installed are not sufficiently pronounced to cause excessive humidity within the food storage space when the door is opened, it is undesirable to circulate the compartment air. In that case, plunger 81 is manually pushed into a position aligning the ends of the pin 87 with the channels 89 and is then rotated to engage the pin ends within these channels to thereby hold the plunger in retracted position against the urge of the spring 86. The end of plunger 81 may be knurled to facilitate the rotation thereof.

The device is preferably designed so that one full stroke of the plunger and pawl against the ratchet will wind the spring sufficiently to maintain switch 63 in its closed position for a timed interval, say for example, thirty minutes, estimated as sufficient to effect removal of the excess humidity which entered the refrigerated space during the time the door was open.

At times, however, such for example as during the preparation of a meal, the door may be opened many times during a short period, and will create an extreme humidity condition within the compartment requiring operation of the circulating fan for a longer period of time to restore the desired conditions within the compartment. For this purpose, the ratchet has been provided with the extra teeth 68 and 69, whereby, when the tooth 67 has been rotated counterclockwise to the broken line position as indicated at 97, tooth 68 will be moved approximately to the position vacated by tooth 67 for engagement by pawl 83 should the door be opened again within a few minutes. Thus, when the door is opened and closed again the clock spring will be wound for another increment of thirty minutes, and tooth 69 will then be in position for engagement by pawl 83 if the door is immediately reopened. It should be understood that the ratchet teeth may be spaced so that a complete stroke of the shaft will advance the succeeding tooth to a position affording a desired lapse of time after completion of the stroke during which the said succeeding tooth will remain in the path of the pawl 83 for operation by the latter in event that the door is again opened and closed.

It is well known that average atmospheric conditions vary according to geographical locality and also as to different rooms in a building. For this reason the clock mechanism has been provided with an adjustment screw 100 for regulating the time interval during which the mechanism will maintain the switch 63 closed to energize the fan motor as described.

It is evident that the invention provides a timing device for automatically effecting (in response to a normal manipulation of the door affording access to a refrigerated space) an intermittent circulation of the air in said space into heat exchange relation with a colder zone for the purpose of maintaining a desired humidity condition. It is evident also that the timing device may be regulated to maintain such circulation for periods of time adjusted to the particular atmospheric condition of the locality wherein the refrigerating apparatus is installed.

While the timing mechanism included in the present invention is particularly useful with refrigerators of the type described, it will be evident that it could be employed for other purposes. It will be understood also that the invention contemplates such changes and modifications as may come within the scope of the appended claims.

I claim:

1. In refrigerating apparatus comprising a refrigerated space, a door affording access to said space, means actuated by movements of the door to closed position for regulating humidity within said space, and a timing device for limiting maximum duration of operation of the regulating means between successive actuations, said device being adjustable to varying extents affording correspondingly varying time increments for continuous operation of said regulating means, and means actuated by the door in closing for adjusting said device to a predetermined normal extent for each said closing, said means being responsive to a predeterminedly short lapse of time between successive door closings to adjust said device to an extent exceeding said normal and affording a correspondingly extended period of continuous operation of said regulating means.

2. In refrigerating apparatus comprising a refrigerated space, a door affording access to said space, means for regulating humidity within said space, and means actuated by the said door in closing for initiating operation of said regulating means and for subsequently terminating said operation, said initiating and terminating means normally affording a period of continuous operation for said regulating means of predetermined duration for each said actuation and including means responsive to a predeterminedly short lapse of time between successive actuations for extending the period of continuous operation following final closing of said door.

3. In a refrigerating apparatus comprising a refrigerated space, a door affording access to said space, means actuated by movements of the door to closed position for regulating humidity within said space, and a timing device for limiting maximum duration of operation of the regulating means between successive actuations, said device being adjustable to varying extents affording correspondingly varying time increments for continuous operation of said regulating means, and means actuated by the door during the cyclic operation thereof entailed in gaining access to and subsequently closing the refrigerator for adjusting said device to a predetermined normal extent for each said operation, said means being responsive to a predeterminedly short lapse of time between successive operations of the door to adjust said device to an extent exceeding said normal and affording a correspondingly extended period of continuous operation of said regulating means.

4. In refrigerating apparatus comprising a refrigerated space, a door affording access to said space, means actuated by movements of the door during the cyclic operation thereof entailed in gaining access to and subsequently closing the refrigerator for regulating humidity within said space, and a timing device for limiting maximum duration of operation of the regulating means between successive actuations, said device being adjustable to varying extents affording correspondingly varying time increments for continuous operation of said regulating means, and means actuated by said door movements for adjusting said device to a predetermined normal extent for each said cyclic operation, said means being responsive to a predeterminedly short lapse of time between successive operations of the door to adjust said device to an extent exceeding said normal and affording an increasingly extended period of continuous operation of said regulating means.

5. In refrigerating apparatus comprising a refrigerated space, a door affording access to said space, means for regulating humidity within said space, and means actuated by the said door during the cyclic operation thereof entailed in gaining access to and subsequently closing the refrigerator for initiating operation of said regulating means and for subsequently terminating said operation, said initiating and terminating means normally affording a period of continuous operation for said regulating means of predetermined duration for each said actuation and including means responsive to a predeterminedly short lapse of time between successive actuations for extending the period of continuous operation following final closing of said door.

JOHN J. BAUMAN.

REFERENCES CITED

The following references are of record in the file of this patent:

UNITED STATES PATENTS

| Number | Name | Date |
|---|---|---|
| 1,866,808 | Ireland | July 12, 1932 |
| 2,065,604 | Miller | Dec. 29, 1936 |
| 2,110,025 | Ridge | Mar. 1, 1938 |
| 2,112,205 | Ahrens | Mar. 22, 1938 |
| 2,113,958 | Kalischer | Oct. 25, 1938 |
| 2,178,807 | Ploeger | Nov. 7, 1939 |
| 2,188,526 | Burden | Jan. 30, 1940 |
| 2,230,191 | Knight | Jan. 28, 1941 |
| 2,263,456 | Darcy | Nov. 18, 1941 |
| 2,292,015 | Schweller | Aug. 4, 1942 |
| 2,304,029 | Smith | Dec. 1, 1942 |
| 2,323,270 | Zielesch | June 29, 1943 |
| 2,327,544 | Newton | Aug. 24, 1943 |